United States Patent
Li et al.

(10) Patent No.: US 10,085,132 B2
(45) Date of Patent: Sep. 25, 2018

(54) SYSTEM AND METHOD FOR DOWNLINK MACHINE-TO-MACHINE COMMUNICATIONS

(71) Applicant: Huawei Technologies Co., Ltd., Shenzhen (CN)

(72) Inventors: Xu Li, Nepean (CA); Aaron Callard, Ottawa (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/949,231

(22) Filed: Nov. 23, 2015

(65) Prior Publication Data

US 2016/0150349 A1 May 26, 2016

Related U.S. Application Data

(60) Provisional application No. 62/084,429, filed on Nov. 25, 2014.

(51) Int. Cl.
*H04W 4/00* (2018.01)
*H04W 4/70* (2018.01)
*H04W 64/00* (2009.01)

(52) U.S. Cl.
CPC ............. *H04W 4/70* (2018.02); *H04W 4/005* (2013.01); *H04W 64/003* (2013.01)

(58) Field of Classification Search
CPC .................................................. H04W 4/005
See application file for complete search history.

(56) References Cited

U.S. PATENT DOCUMENTS

| | | | |
|---|---|---|---|
| 8,942,170 B1 * | 1/2015 | Fang | H04W 4/005 370/328 |
| 2007/0275707 A1 * | 11/2007 | Kwak | H04W 60/04 455/414.2 |
| 2012/0033613 A1 * | 2/2012 | Lin | H04W 74/085 370/328 |
| 2012/0243422 A1 * | 9/2012 | Jokimies | H04W 4/006 370/242 |
| 2012/0282956 A1 | 11/2012 | Kim et al. | |
| 2013/0028184 A1 | 1/2013 | Lee et al. | |
| 2013/0053087 A1 * | 2/2013 | Li | H04W 76/002 455/518 |
| 2013/0115954 A1 | 5/2013 | Charbit et al. | |

(Continued)

OTHER PUBLICATIONS

Li, X. et al., "Carrying MTC Services in 5G—A Network Management Perspective," 2012, 6 pages.

(Continued)

*Primary Examiner* — Anh-Vu Ly
(74) *Attorney, Agent, or Firm* — Slater Matsil, LLP

(57) ABSTRACT

An embodiment method for downlink machine type communications (MTC), includes receiving, at a base station, parameters including a geographic location related to a remote equipment (RE), receiving a predicate identifying the RE, determining a target zone in which the RE is located, determining a radio bearer associated with the target zone, and transmitting a data packet and the predicate by the base station on the radio bearer to a plurality of REs disposed in the target zone, the plurality of REs comprising at least the RE.

25 Claims, 7 Drawing Sheets

(56) References Cited

U.S. PATENT DOCUMENTS

| | | | | |
|---|---|---|---|---|
| 2014/0126489 A1* | 5/2014 | Zakrzewski | .......... | H04W 28/26 |
| | | | | 370/329 |
| 2014/0140300 A1* | 5/2014 | Barrett | .................. | H04W 4/005 |
| | | | | 370/329 |
| 2015/0099555 A1* | 4/2015 | Krishnaswamy | ....... | H04W 4/06 |
| | | | | 455/509 |
| 2015/0257127 A1* | 9/2015 | Huarui | .................... | H04W 4/06 |
| | | | | 370/312 |
| 2016/0270024 A1* | 9/2016 | Nakata | .................. | H04W 92/12 |
| | | | | 370/328 |

OTHER PUBLICATIONS

"M2M Device Connections Will Increase Twentyfold Worldwide in the Next Ten Years, Analysys Mason Reports,"Found at: http://www.analysysmason.com/About-Us/News/Press-releases/M2M-forecast-2012-PR-Jun2012/, Nov. 23, 2015, 3 pages.

3GPP TR 23.887 V12.0.0 (Dec. 2013),3rd Generation Partnership Project;Technical Specification Group Services and System Aspects;Study on Machine-Type Communications (MTC) and other mobile data applications communications enhancements(Release 12), total 151 pages.

3GPP TR 23.888 V11.0.0 (Sep. 2012),3rd Generation Partnership Project;Technical Specification Group Services and System Aspects;System improvements for Machine-Type Communications (MTC)(Release 11), total 165 pages.

3GPP TSG SA WG2 Meeting #78 TD S2-101048,"Discussion on MTC downlink transmission using broadcast/multicast capability", Alcatel-Lucent Shanghai Bell, Alcatel-Lucent, Feb. 22-26, 2010, total 2 pages.

* cited by examiner

SYSTEM AND METHOD FOR DOWNLINK MACHINE-TO-MACHINE COMMUNICATIONS

This application claims priority to U.S. Provisional Application Ser. No. 62/084,429, filed on Nov. 25, 2014, entitled "System and Method for Downlink M2M Communications in 5G," which application is hereby incorporated by reference.

TECHNICAL FIELD

The present invention relates to a system and method for wireless communications, and, in particular embodiments, to a system and method for downlink machine type communications (MTC) on machine-to-machine (M2M) wireless transmission systems.

BACKGROUND

Machine-to-machine (M2M) networks are being developed to provide long-term monitoring and control services, using machine type communications (MTC) for applications such as traffic monitoring, environmental monitoring, battlefield surveillance, industrial monitoring and control, etc. With an expectation that the number of MTC devices will increase greatly in the coming years, mobile network operators are exploring new ways to serve these devices to open new revenue streams.

SUMMARY

An embodiment method for downlink machine type communications (MTC), includes receiving, at a base station, parameters including a geographic location related to a remote equipment (RE), receiving a predicate identifying the RE, determining a target zone in which the RE is located, determining a radio bearer associated with the target zone, and transmitting a data packet and the predicate by the base station on the radio bearer to a plurality of REs disposed in the target zone, the plurality of REs comprising at least the RE.

An embodiment method for downlink machine-type communications (MTC), includes receiving, at a network element, a data packet having at least one first parameter comprising a at least one first geographic location, receiving a predicate associated with the data packet and determining a base station associated with the at least one first geographic location. Second parameters comprising at least one second geographic location related to the first geographic location and further comprising a base station identifier of the base station are generated, and the predicate and the data packet with the second parameters are transmitted to the base station.

An embodiment network element includes a processor and a non-transitory computer readable storage medium connected to the processor. The non-transitory computer readable storage medium has stored thereon instructions that, when executed by the processor, cause the network element to obtain a data packet having at least one first parameter comprising a geographic location, wherein the data packet is received over a communications interface, obtain a predicate associated with the data packet and identify a network access point associated with the geographic location. The instructions further cause the network element to generate second parameters according to the geographic location and forward at least a portion of the data packet and the associated predicate to the identified network access point for transmission to a device associated with the geographic location.

An embodiment network access point includes a transmitter, a processor connected to the transmitter, and a non-transitory computer readable storage medium connected to the processor. The non-transitory computer readable storage medium has stored thereon instructions that, when executed by the processor, cause the network access point to obtain parameters including a geographic location, and obtain data and a predicate identifying at least one remote equipment (RE), wherein the parameters, the data and the predicate are received in a data packet through the transmitter. The instructions further cause the network access point to determine a target zone in which the at least one RE is located, determine a radio bearer associated with the target zone, and transmit, on the radio bearer through the transmitter, the predicate and a data packet comprising the data to the at least one RE disposed in the target zone.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
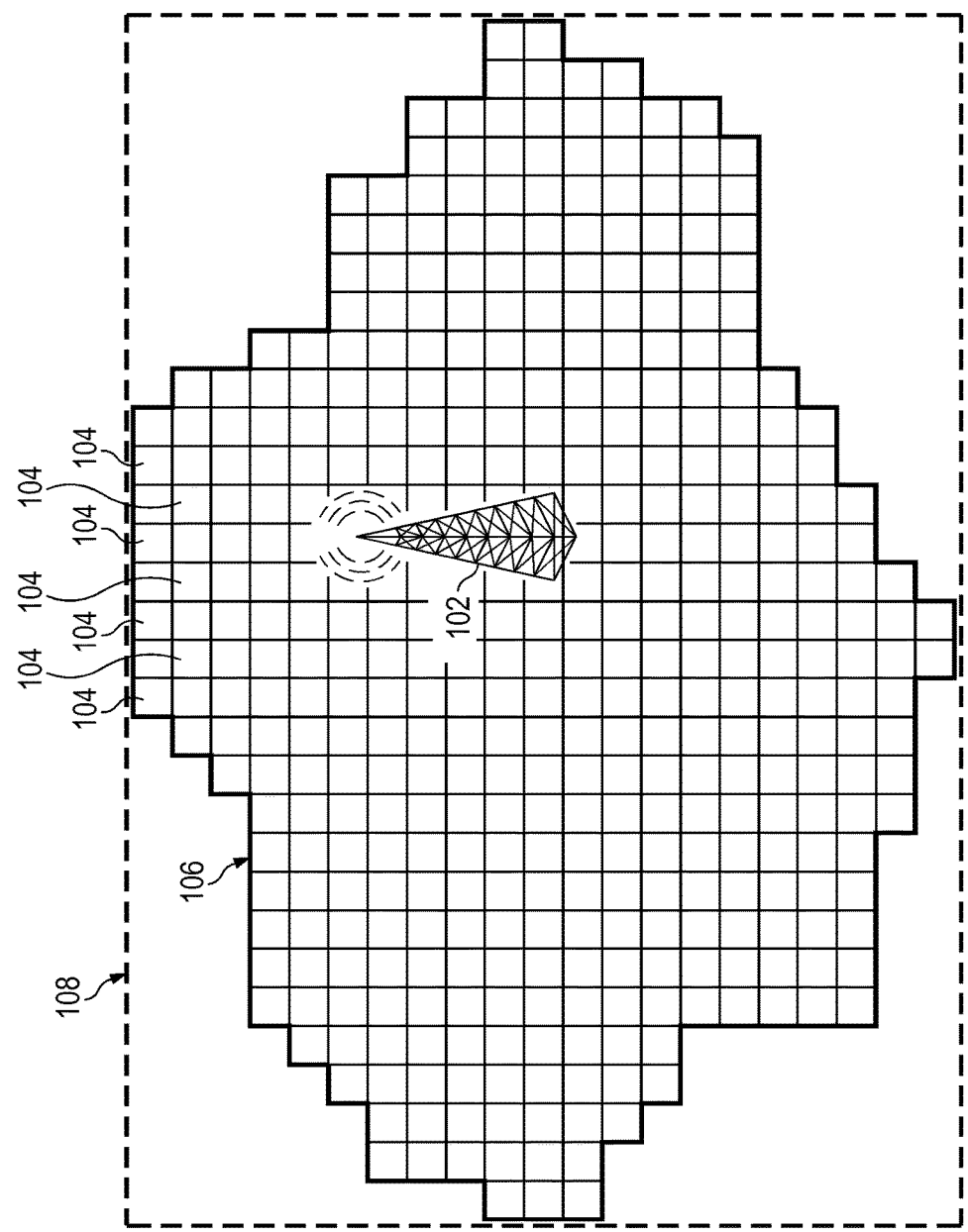
FIG. 1 is a diagram illustrating grouping and association of zones and a base station in a cell according to some embodiments.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In traditional wireless networks, base station association is done on a per-user equipment (UE) basis, and downlink communication is based on UE identification/Internet protocol (ID/IP) addressing. Thus, each UE can decode received signals to obtain individualized communications from a base station. Such an arrangement provides UEspecific communication, but requires an addressing resource to be dedicated to an individual UE.

Broadcast transmissions, such as those for television and for multimedia broadcast/multicast service (MBMS) and enhanced MBMS (eMBMS) are transmitted without a specified target. Broadcast signals do not have target location information, and are decodable to all devices within a transmitter's range.

As the number and density of sensors in M2M communications systems increases, the complexity of routing communications to individual remote equipments (REs) such as sensors or the like, increases. Generally, MTC systems perform table lookup at routers to find routing information when transporting MTC packets. Additional table lookups are performed at base stations for synchronizing transmission/reception with machines. In particular, for downlink MTC traffic in wireless networks one of the major challenges is to control table lookup cost at individual network nodes. The increasing number and density of REs deployed in the network causes the lookup tables to become unwieldy due to the number of entries in a lookup table for a particular area. When dealing with large numbers of REs, the table lookup cost may exceed allowable limits and introduces unacceptable delay in executing communications to the REs.

Location-based addressing permits offloading of location tracking and reduces the resources required to support increasing RE deployments. In particular, embodiments of the disclosed location-based communications system provide a controllable lookup cost through location-based RE grouping and group-based cell or transmitter association, application-specific features for routing traffic, multi-casting and broadcasting communications from a base station to individual REs or RE groups, and traffic filtering/selective communication. Those skilled in the art will appreciate that this disclosure makes reference to cell association, which is well known in 3G and 4G mobile networks. Although next generation networks may move away from a cellular structure, and another term may be used, it should be understood for the purposes of this disclosure, that the term cell association is understood to cover any suitable replacement that associates a device (or group of devices) to a particular access point, or a set of access points that may serve a location.

An embodiment enables carrying MTC service in 5G wireless communication with acceptable and controllable table lookup cost at base stations and routers. Table lookup cost at each base station can be controlled by limiting the number of associated geographic zones, referred to herein as zones, and by adjusting the granularity of the geographic zoning (e.g. changing squarization granularity). An embodiment enables specialized application-specific mobility tracking schemes in a broadly applicable way.

FIG. 1 is a diagram illustrating grouping and association of zones 104 with a base station 102 in a service area according to some embodiments. Inside a network coverage area, the network can be divided into geographic regions associated with network access points (e.g. base station 102). It is possible to further divide the coverage area of a network access point. In the example of FIG. 1, the coverage area 106 can be divided intodistinct geographic zones. In the example of FIG. 1, coverage area 106 is divided into zones 104. The process of dividing a coverage area into zones is referred to as squarization. Although the present example makes use of zones 104 with square shapes, and this disclosure generically refers to the subdivided elements as being square, it will be apparent to those that any shape zone may be used. The division into subdivision elements can be done in accordance with specified resolution requirements. One example of such a resolution requirement is that no subdivision element (e.g. zone 104) can have more than a threshold number of REs. It should also be understood that when a coverage region, such as a coverage area 106, is divided into elements such as zones 104, in some embodiments there may be a requirement that all subdivision element be of the same size. Although one simple-to-manage implementation may have a coverage area divided into equally sized subdivision elements such that the subdivision elements tile to completely cover the coverage area, it should be understood that this is not a requirement. Those skilled in the art will appreciate that a coverage area may not be a regular shape, and it may not be possible to completely cover the coverage area with the selected subdivision shape.

It should be understood that if a coverage area is subdivided into a series of two dimensional areas, three dimensional locations can be projected onto a two dimensional map. Thus, for example, the height of an RE is ignored and all REs that are within a given two dimensional boundary are in the same subdivision. If greater resolution is required, the coverage of an access point, which is 3 dimensional (a coverage volume), can be subdivided into three dimensional sub-divisions. In such a case, a coverage volume can be subdivided into elements that may be cubes, spheres, spheroids, or other three dimensional shapes. It should be noted, that each shape, either two dimensional or three dimensional, can be associated with a network access point.

For the purposes of the following discussion, a two dimensional subdivision will be used, and all subdivision elements or zones will be have square shapes. This is for the sake of simplicity and ease of understanding. Those skilled in the art will be able to apply the teachings of this reference to zone shapes other than squares in both two and three dimensions.

A unique code is assigned to each zone 104 for identification. In some embodiments the unique code not only identifies the particular zone but can also include information that identifies the associated network access point such as a base station 102. The boundaries of each zone 104 can be compactly represented by, for example, the north-west corner and its side length or resolution. The location of the northwest corner can be specified in a number of different formats including its latitude and longitude. For example, at 38 degrees north latitude, one degree of latitude equals approximately 364,000 ft. (69 miles/111 km), one minute equals 6068 ft. (1.15 miles/1851 m), and one second equals 101 ft. (30.8 m). One-degree of longitude equals 288,200 ft. (54.6 miles/90.7 km), one minute equals 4800 ft. (0.91 mile/1463 m), and one second equals 80 ft. (24.4 m). Thus, each zone 104 may be delineated by a division of latitude and longitude. For example, each zone 104 may be two seconds of latitude by two seconds of longitude, resulting in a zone that is approximately 202 ft. by 160 ft. (61.6 m by 48.8 m). In such an embodiment, the zones 104 may have boundaries starting every two seconds of latitude and longitude. Thus, a first zone may be located with a northwest corner at 32°46'42"N 96°48'28"W and an adjacent second zone may be located with a northwest corner at 32°46'44"N 96°48'28"W. An algorithm or other tracking method may be used to determine the boundaries of a zone by, for example, the zone ID.

In some embodiments, a network may maintain the associations between access points, or access point coverage areas such as cells, and the member zones 104 covered by the base station 102. In some embodiments, a zone 104 may be associated with multiple base stations 102. A zone hierarchy may be used to facilitate the maintenance and tracking of zones, as in a domain name system (DNS).

In some embodiments, the network may maintain per-base station coverage information indicating coverage of zones 104, and may include a bounding coverage box 108 and a coverage contour 106. In such an embodiment, given a zone 104, the network determines the cell associated with a particular location by narrowing down to base stations 102 whose bounding coverage boxes cover the zone and then examining the corresponding coverage contours to determine whether a location of zone 104 is associated with a particular base station 102. It should be understood that bounding box 108 is the smallest rectangle that covers all the zones 104 in coverage area 106.

In some embodiments, the network maintains statistical information on path loss and (per service) MTC traffic load for each zone 104. Cell association for zones 104 can be optimized on the network for individual MTC services separately, or for any number (up to all) of MTC services jointly. Dynamic cell association can be realized through a close-loop feedback system, where base station loading information and per zone traffic quality information are utilized to adapt cell associations. In some embodiments, cell association is determined based on the MTC statistics and possibly the statistics of other traffic. For example, a zone 104 at the edge of a coverage contour 106 may be assigned to an alternate base station 102 when REs in the particular zone 104 are experiencing excessive interference, when network traffic to the base station 102 exceeds a particular threshold, when the number of REs in the zone 104 exceed or fall below at threshold, or according to any other network, transmission, or traffic metric.

Each base station 102 is associated with a set of zones 104 and may maintain or use a separate radio bearer for each of these associated zones 104. Thus, a base station 102 may communicate with each zone 104 separately using the individualized radio bearer.

Figure 2:
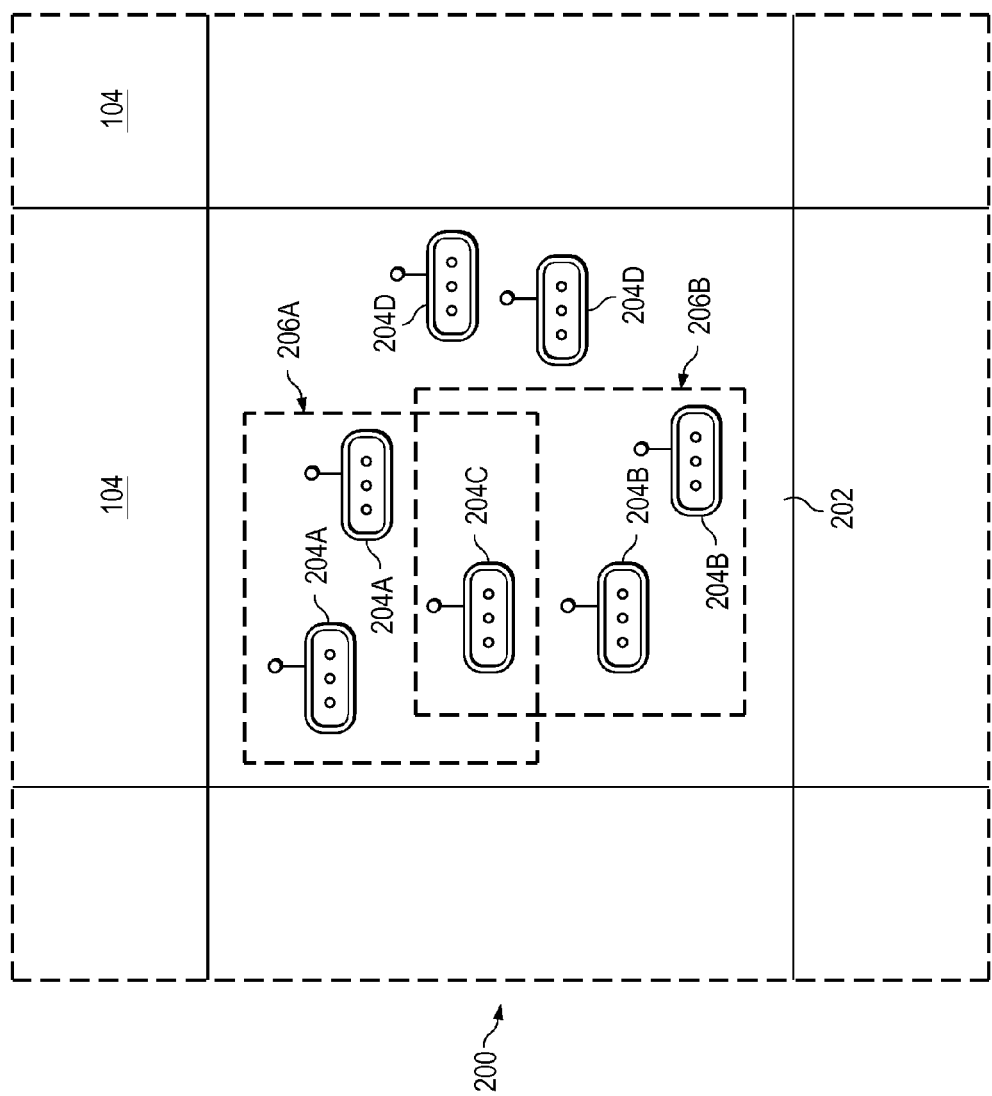
FIG. 2 is a diagram illustrating grouping of remote equipments in a target zone according to some embodiments.

FIG. 2 is a diagram illustrating grouping of REs 204A . . . 204D in a target zone 202 according to some embodiments. A base station addresses or communicates with REs 204A . . . 204D on a zone-by-zone basis.

One or more REs 204A . . . 204D are locating in each zone 104, and when an application transmits to one or more of the REs 204A . . . 204D, the RE is addressed in part by location. Based on the identified RE, a network controller designates the zone associated with the target as a target zone 202. The association of REs 204A . . . 204D to zone 104 is performed during the tracking of the location of the RE. Every RE 204A . . . 204D is either preconfigured with its geographic location or is able to dynamically determine its geographic location through, for example, an equipped localization means such as global positioning system (GPS), triangulation by access points, inertial tracking, or the like. Thus, in some embodiments, a stationary sensor such as a traffic sensor, a weather sensor, a security sensor, seismic or environmental sensor, may be assumed to be deployed at a fixed location. The location of a stationary RE may be configured during deployment. This permits a reduction in the overhead associated with obtaining geographic location data used to assign the RE to particular zone 104. In contrast, a mobile sensor such as a vehicle motion or control sensor, a portable sensor, a mobile communications, a theft recovery device, or the like, may be equipped with active location determination systems, such as a GPS/GLONASS receiver, access point triangulation capability, or the like, to dynamically determine the REs location.

In some embodiments, REs 204A . . . 204D are divided into groups according to geographic location, the zone 104 associated with the REs 204A . . . 204D, service, capability, device type, or the like. For example, all of the REs 204A . . . 204D located in in a target zone 202 may form a group. REs 204A . . . 204D may also be associated with one or more other groups based on other factors. For example, first REs 204A may be weather monitoring sensors, second REs 204B may be vehicle velocity sensors, third REs 204C may be a vehicle sensors configured for sensing vehicle velocity and weather conditions, and fourth REs 204D may be other types of sensors. Thus, a group of REs in a zone may be divided into sub-groups according to the services the REs belong to or according to capabilities of each of the REs. In such an example, a first group may include all REs in a zone 104, and a second group 206A may be a sub-group that includes REs 204A and 204C used by a weather station measurement service. In other examples, another, third group 206B may include REs in the zone 104 that have speed measurement capabilities, that are used by a traffic monitoring service, that are used by a vehicle theft recovery service, or the like.

RE grouping happens automatically at each of the REs 204A . . . 204D when the squarization resolution or zone boundaries and the RE location are known to the RE 204A . . . 204D. The REs 204A . . . 204D store the grouping information locally, reducing the computational load on the network. Thus, each RE 204A . . . 204D may store information related to the capabilities, service, device type and location of the RE, and may respond to communications indicating groups by groups IDs, or other stored information. In some embodiments, RE groups are identified by their hosting zones. Each machine group automatically becomes associated with the associated base station of its hosting zone(s).

Figure 3:
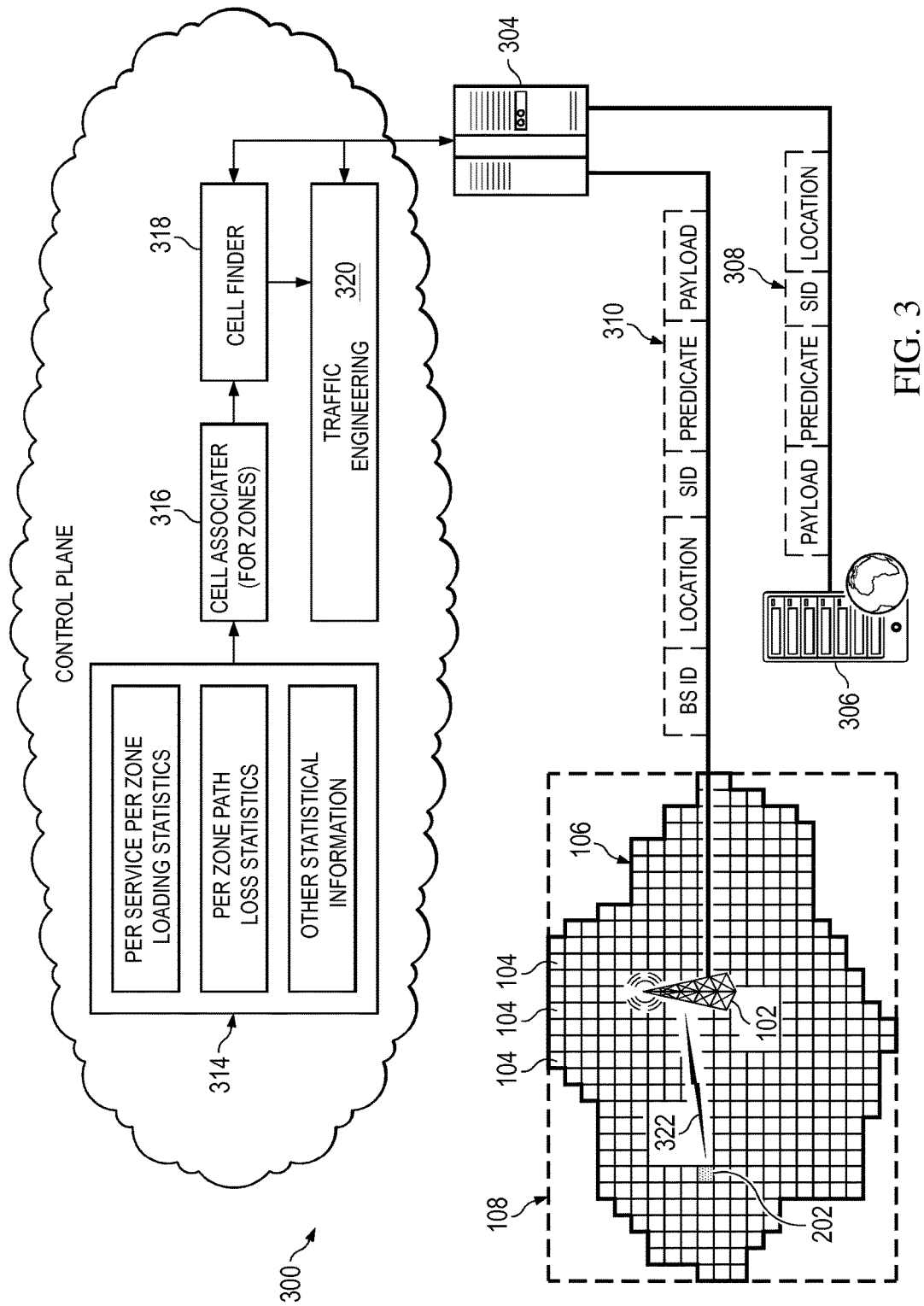
FIG. 3 is a diagram illustrating a system for location-based communication according to some embodiments.

FIG. 3 is a system diagram illustrating a system 300 for location-based communication according to some embodiments. In such an embodiment, an MTC application 306 generates a data packet intended for transmission to one or more REs. In some embodiments, the MTC application is an application such as a third party application, standalone application, or the like, which may be running on a server or a logical node. A logical node is a virtualized node that implements one or more application-level functionalities. It is instantiated through SDT (software defined topology) and NFV (network function virtualization) techniques in the physical network infrastructure on select NFV-enabled network nodes.

The data packet is transmitted to a network element 304, and on to a base station 102. The network element 304 determines the relevant base station 102 and passes the data packet to the base station 102. The base station 102 determines a target zone 202 to which to send the packet, and then transits the packet on a bearer 322 associated with the target zone 202.

For location-based communication, the MTC application 306 specifies a universal unique ID such as a service identifier (SID) associated with the MTC application 306 and a target location during a communication session. In some embodiments, the MTC application 306 generates at least one packet, message, communication or the like with one or more first parameters 308. The first parameters 308 include, in some embodiments, the SID or other information identifying the MTC application, the target location of the targets RE(s) or RE group(s), a payload or data intended for the target RE(s) and a predicate or other identifier of the target RE(s).

The target location may be a location related to an RE, an RE location, or the location of an RE group, zone 104, or base station 102. The MTC application 306 fetches each RE's location or RE group's location from a storage medium, such as a database, working memory, or the like. In some embodiments, the location of each RE is initially set when the RE is deployed, for example in the case of stationary REs, or when the RE registers with or initially connects to the MTC application 306 or network, for example, in the case of a mobile RE. In some embodiments, if an RE's location is not available at deployment time, the RE may communicate with the MTC application 306 to update the RE's current location through uplink communication. The target location may indicate a single geographic point, a set of discrete geographic points, a series of continuous of geographic points, or a geographic area, a combination of the same, or the like. Thus, the zones covering the target location are the target zones. The REs in the target zones rely on the predicate to determine whether they are an intended receiver. In some embodiments, the RE or group location is latitude and/or longitude coordinates. In some embodiments, the location of the target RE(s) may be represented by, for example, regions defined by a center point and a radius, a set of coordinates, a coordinate and resolution, a coordinate combined with a known resolution, a distinct latitude and longitude, a point of interest, geographic or structural feature, or the like. Thus, for example, in the case where the application is location dependent, but not machine or RE dependent, such as for use in a traffic condition monitoring application, the RE location may be a point of interest such as an intersection, highway, building, or the like. In other embodiments, the target location is a base station or base station location, and a data packet may be transmitted to all REs served by the base station, with the REs evaluating the predicate to determine whether they are an intended receiver. Thus, the location parameter sent to the base station maybe blank or omitted, and the base station will transmit the data packet to all REs in the base station transmission area.

The data packet and first parameters 308 are transmitted to a network element 304 such as an ingress router, control plane element, core network element, or the like. In some embodiments, the network element 304 is an ingress router that handles traffic generated outside the network) or, in other embodiments, is a logical or virtual node that handles traffic such as a packet data network gateway (P-GW), serving gateway (S-GW), mobility management entity (MME), or the like.

In some embodiments, the network element 304 submits information regarding the data packet or first parameters to the control plane 312 for identification of the cell and/or zone associated with the target location or routing. The control plane, in some embodiments has entities such as a cell finder 318, cell associater 316 and traffic engineering component 320. In some embodiments, the cell finder 318, cell associater 316 and traffic engineering component 320 are disposed on a dedicated network device, are part of the control plane 312, are separate entities, are part of the network element 304, or are part of an entity on the network.

Cell association information for zones is maintained by a cell associater 316 in the control plane 312. The network calculates, for each base station 102, service traffic characteristics 314 and considers the base station 102 as a virtual machine for the service traffic characteristic monitoring. REs or zones 104 are automatically associated with base stations 102 according to their location, traffic and load parameters, zone loading characteristics, per-zone path loss statistics, or any other network performance statistics. The cell associater 316 maintains and updates the cell-to-zone association information in a storage medium such as a database, working memory, or the like. In some embodiments, the location or boundaries of the zones 104 are part of the cell-to-zone association, permitting lookup of a zone 104 and associated base station 102 using a given location.

In some embodiments, a cell finder 318 may be disposed in the control plane 312 and will have hardware, or a combination of software and the relevant hardware for executing the software, for finding a cell based on the location in the first parameters 308. In the control plane 312, the cell finder 318 takes the cell association decision/update from the cell associater 316 or from a storage location, and maintains the information in such a way that target base stations 102 can be quickly identified by target location. For example, the cell finder 318 may maintain the cell associations in working memory in a binary tree data structure, may generate one or more formulas representing the cell associations, store the cell associations in a database structure such as a structure query language (SQL) or no-SQL database arrangement, or the like.

In an embodiment, a network operator makes geographic segmentation (e.g. squarization) public. An MTC service customer specifies machine distribution, in terms of zones and per zone machine count, and machine traffic distribution, in terms of per-zone data rate, along with other information. The information is submitted to the network in, for example, a service request.

The network then creates and maintains a service-customized information-centric network architecture for the MTC service according to the virtual machines. The virtual machine traffic characteristics can be updated over time through service traffic measurement done at respective base stations. When necessary, the architecture can be updated or re-generated using the new information. Machines use this architecture to report their readings and location information.

The control plane 312 computes the target zone 202 according to the target location embedded in the packet and determines the target base station 102 for the service. In some embodiments, the network element 304 sends a second packet to the target base station 102. The control plane 312 provisions the traffic through a traffic engineering component 320, sets up the data forwarding path in the data plane, or provides traffic engineering information to the network element, which determines a route to the target base station according to the traffic engineering information. In some embodiments, the packet has second parameters 310 that include a base station identifier (BS ID) determined by the control plane 312, which is used for routing the second packet to the target base station 102. The second parameters 310 also include the predicate, SID, location and data or payload from the first parameters 308. In some embodiments, the network element 304 modifies the packet sent from the MTC application 306 by adding the BS ID or modifying other elements of the packet. In other embodiments, the network element 304 re-forms or generates a new packet with the second parameters 310 based the first parameters 308. Additionally, in some embodiments, the location in the second parameters 310 is a second geographic location related to the first geographic location in the first parameters 308. For example, the location in the second parameters may be the same, covered by, part of, described by, or indicated by, the location in the first parameters 308.

In other embodiments, the network element 304 has hardware and software with instructions for determining the base station and appropriate target zone 202 associated with the location in the first parameters.

The data packet is then routed toward the target base station 102 through, for example, a dedicated control channel, traffic-engineered path(s) or plain (not traffic engineered) path(s). In some embodiments, upon receiving a data packet, the base station 102 retrieves the service ID and the target location from the data packet, computes the target zone 202, obtains the corresponding radio bearer 322, and broadcasts the data packet to the REs in the target zone 202. In some embodiments, such a location dependent routing process is performed for each individual packet, and in other embodiments, the location dependent routing process is performed when establishing a connection, with the connection being maintained through the selected route for transmission of multiple packets.

For application-defined traffic filtering, the MTC application 306 may encapsulate a predicate into each data packet as part of the first and second parameters 308 and 310. When an RE receives a data packet, the RE evaluates data stored on the RE against the predicate to determine whether the RE qualifies or meets the criteria of the predicate. If the RE determines that the RE is one of the intended recipients of the packet, it keeps the packet for processing or otherwise taking action according to the data or payload. If the RE determines that it does not qualify, it ignores or discards the packet. The MTC application 306 has the freedom to define such predicates to enable selective communication or traffic filtering.

In some embodiments, the predicate is carried in the data packet itself, either as part of the header, or as part of a standard transmission protocol data payload. In other embodiments, the base station 102 transmits the predicate on a control channel or in control channel space, permitting the RE to access the predicate without decoding the data packet. In such an embodiment, the data packet is transmitted separately from the predicate and can, therefore, be encoded while the predicate is unencoded or is encoded with a less processor-intensive encoding scheme than the data packet.

In some embodiments, the predicate may simply specify an internal machine ID (or a group of IDs), enforcing a uni-casting effect as opposed to a multi-casting effect. For example, the predicate is set up to cover machines whose remaining battery power is lower than a particular threshold. In other embodiments, the predicate may be left blank or omitted entirely to indicate that the transmission is intended for every RE in a particular zone, effectively creating a multi-cast transmission using the same format as a uni-cast transmission. Similarly, the location in the second parameters sent to the base station may be left blank or omitted, and the base station will then transmit the data packet to each RE in the base station's transmission area and rely on each of the REs to determine, based on the predicate, whether the particular RE is an intended receiver.

Downlink MTC communication may happen when the MTC Application 306 wants to transmit information (e.g., a control command, such as updating smart meters with a new transmission schedule due to peak hour or business logic change in an area). The data or payload transmitted to the REs may have data, commands. As another example of transmitting a control command, the MTC application 306 may want to switch sensors' operation model in a traffic condition monitoring application for extended lifetime, such as when the sensors with a battery power lower than a threshold are to be put into sleep. The predicate is set to reflect the logic. Downlink MTC may happen when an MTC application 306 or logical node wants to transmit information to REs, as a result of in-network processing, for example, when a fire is detected in a woody area in a wild fire monitoring application, and fire-fighter actuators need to be activated. The predicate is set to reflect only fire-fighter type machines within a certain distance to the area center are intended receivers. In this case, the traffic is generated by some application-layer data process instantiated at the logical node.

In some embodiments, the predicate may be a SQL-style predicate, such a string or statement having one or more Boolean statements or arguments. Thus, complicated logic can be embedded in the predicate. For example, the predicate may be a string such as "GROUPID=07 AND POWER<10%" indicating that REs within the zone who are part of Group 07 and whose power level is lower than 10% should decode and execute the data or payload. Another predicate string may be "DEVICEID=12345" indicating that a specific RE having the device ID of 12345 should decode the packet and execute the data or payload. Yet another predicate string may be "DEVICETYPE=WEATHER AND CAPABILITY=TEMPERATURE" indicating that all REs that are identified as being a device type "WEATHER" (or any other specified device type) and having a capability of measuring temperature (or any other specified capability) should decode the packet and execute the payload. It should, be understood that these string predicate examples are intended to be exemplary and are not limiting, as any Boolean operation, script, or other predicate may be used.

In other embodiments, the predicate may have a data structure in a known arrangement that is evaluated against, or compared to, data stored on the RE. For example, the predicate may be binary data that is arranged in a known predetermined structure or order, and the testing of the predicate against data stored in the RE may be performed by bitwise Boolean logic. For example, a binary predicate may be 1010 0001 indicating data such as the device type, for example, in the first 4 bits, and capabilities, for example, in each of the second 4 bit. An RE of a different group may generate binary data of 1000 0001 or an RE not having the desired capabilities may generate binary data of 1010 0010. In such examples, binary data generated by the RE may be compared in a bit-wise fashion against the binary predicate using, for example, a not exclusive OR (XNOR) operator. Thus, if each bit of the generated binary data matches the predicate, the result of the XNOR comparison would be true. In the above examples, the comparison result would be false since each of the generated binary data sets has at least one bit that does not match the corresponding bit in the binary predicate.

Figure 4:
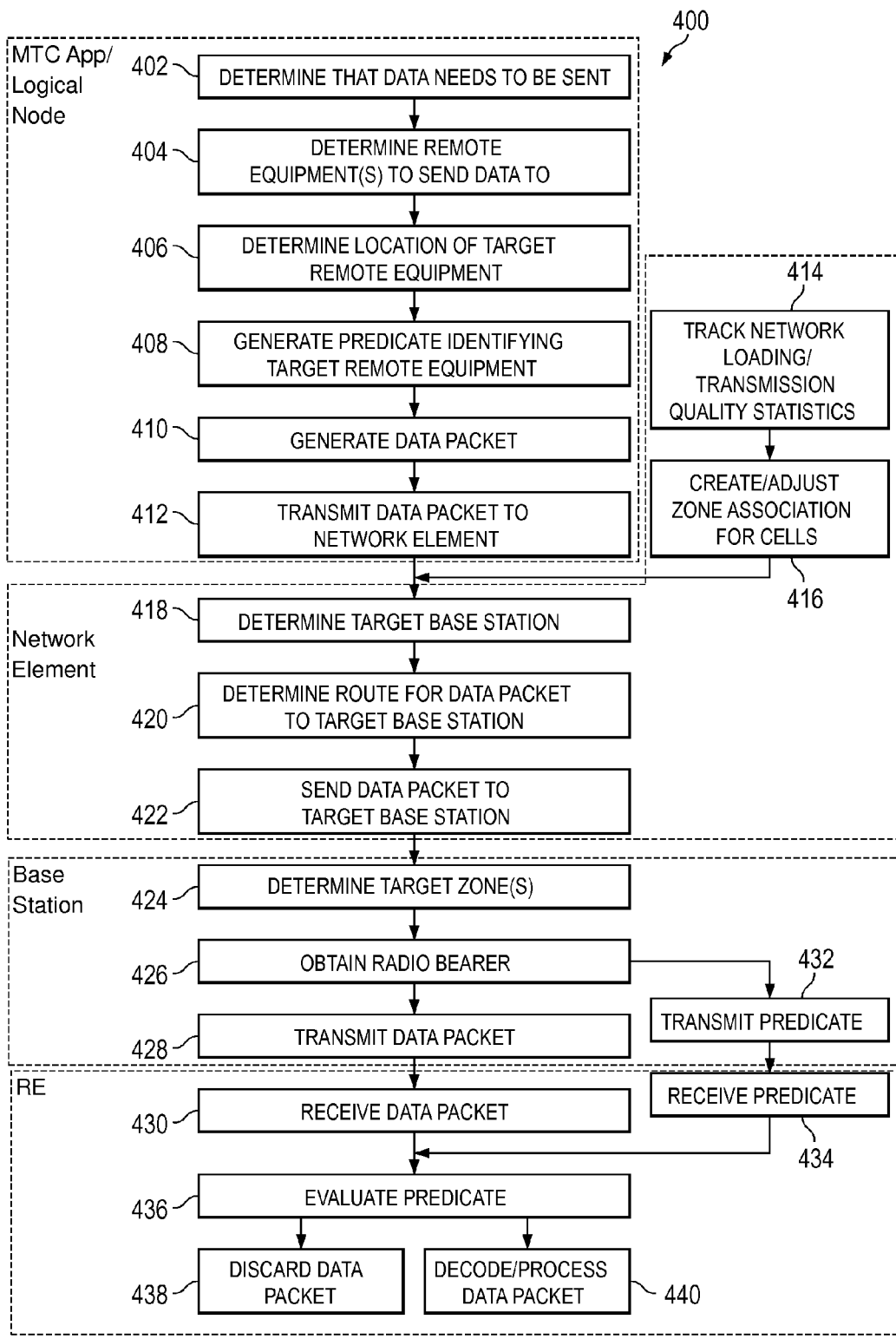
FIG. 4 is a flow diagram illustrating a method for location-based communication according to some embodiments.

FIG. 4 is a flow diagram illustrating a method 400 for location-based communication according to some embodiments. It should be understood by those skilled in the art that the flowchart of FIG. 4 shows the operation of different nodes in the transmission of data from a source to the destination RE. It should be understood that the steps shown in FIG. 4 are not all carried out at a single node, and the operation of any given node can be independent from the operation of another node, and the function of any node should not be considered to be reliant on the operation of another node. This figure is intended for ease of understanding and should not be interpreted as indicating that all nodes must be present or operating exactly as shown. Variation in the operation of one node does not necessarily impact the operation of other nodes. According to some embodiments, an MTC application or logical node determines, in block 402, that data needs to be sent to one or more REs. In block 404, the MTC application or virtual node determines which RE(s) to send data to, and in block 406, determines the location of the RE(s). In some embodiments, the determination that data needs to be sent in block 402 is made as a result of the MTC application or virtual node executing software that generates a command, message, data, alert or the like that requires communication to a specific RE or REs, a group of REs, a class of REs, or the like. Thus, for example, an MTC application may determine that a particular RE needs to be queried for new data, and may send the RE a command that the RE gather and transmit data. In such an example, the MTC application may determine that a particular RE needs to be sent data, and so the determination that data needs to be sent, and the determination of which RE should be sent data may be performed in a single process.

The location of the target RE is determined in block 406. In some embodiments, the location is determined based on the identification of the target RE, and in other embodiments, a location is determined, and the relevant REs are determined from the location, the base station serving the relevant REs, or the location of a base station serving the relevant REs. For example, where an MTC application or virtual node needs to send data or commands to a specific RE or groups of REs, the determination may be made with reference to the RE, and the location determined from the information related to the RE. In another example, an MTC application or virtual node that needs to transmit data to a device type, service class, particular area or group may determine the location of the area or group, and then determine the REs corresponding to the area or group. In some embodiments, the location may be the location or a landmark point of interest, group, or another non-RE specific location, and the location may be used to determine the relevant base station, with the predicate identifying target REs by, for example, device type, service class, area, RE group or the like.

In block 408, the predicate identifying the target remote equipment is generated. In some embodiments, the predicate is generated by the MTC application or the virtual node according to the identification of REs, groups, location of the target REs, device type of target REs, target service type, or the like.

The data packet is generated in block 410 by, or under the control of the MTC application or virtual node. For example, the MTC application or virtual node may generate the data packet directly, or may send a message or control signal to another server such as a database, business logic server, web server or the like to generate the data packet. Additionally, in some embodiments, the data packet includes first parameters, including the predicate. In such an embodiment, the first parameters, including the predicate, may be disposed in the header of the data packet, or in the data payload of the data packet. In other embodiments, the predicate is generate and maintained separately from the data packet and maintained, for example, in memory or like.

In block 414, network loading and/or transmission quality statistics are tracked by, for example, network elements. In some embodiments, network devices such as routers, control plane elements, eNodeBs, base stations, and the like, report network conditions characteristics such as the network loading and transmission quality statistics, to, for example the cell associater, which associates REs or zones with cells of base stations in block 416. REs or zones are automatically associated with base stations 102 according to their location, traffic and load parameters, zone loading characteristics, per zone path loss statistics, or any other network performance statistics.

After the predicate and the data packet are generated in blocks 408 and 410, the data packet and the predicate, if separate from the data packet, are transmitted to the network device in block 412. In block 418, the target base station is determined. In some embodiments, the target base station is determined by the network element, or by the network element transmitting the location information to the cell finder, which determines the cell and/or zone associated with a particular location.

It has been determined that avoiding communications based on the unique identifier of an RE reduces the size of lookup tables on the network. This is because a location-based communication merely requires that the network track the zone and base station of the RE, with the network and base station determining the relevant zone and base station from a location. Thus, an unlimited number of REs may theoretically be associated with a zone without increasing the processing power or memory needed by the network. Additionally, the association between a particular RE and a location is off-loaded to the MTC application or virtual node. Thus, the processing associated with location-based RE tracking may be offloaded to the party or device initiating the transmission. Furthermore, reception or handling of the transmissions is offloaded to the REs so that particular REs do not need to be identified or tracked by the network. The use of a predicate permits the MTC application or virtual node to identify one or more REs by group, service type, ID, location, device type, or the like without requiring the network itself track the REs.

Once the target base station is determined, a route for transmission of the data to the target base station is determined in block 420. In some embodiments, the network element receives routing information from the traffic engineering component, and in some embodiments, the network element determines the route to the target base station according to information received from the traffic engineering component which may be generated according to network load or congestion information, network availability or capacity information, or the like.

In block 422, the network element sends the data packet and predicate to the target base station using the routing information received from the traffic engineering component or generated by the network element. After receiving the data packet and predicate, the base station determines the zone corresponding to the target location identified for the data packet in block 424. In some embodiments, the cell associater or cell finder provides the target zone information to the network element, which transmits the zone information to the base station as part of the data packet, as part of the second parameters, with the predicate, or separately from the data packet and predicate. In other embodiments, the base station determines the zone from the location according to the location and a zone association algorithm, table or other lookup or zone association mechanism.

In block 426, the base station determines the radio bearer associated with the target zone. In some embodiments, the base station has a radio bearer previously associated with the target zone, and determines the appropriate radio bearer from the target zone that was previously identified. In other embodiments, the base station assigns a radio bearer to the zone upon a data packet for the target zone being received.

In block 428, the data packet is transmitted by the base station to the REs in the target zone. In some embodiments, the data packet is transmitted on the selected radio bearer to all REs within the zone. In such embodiments, the base station relies on each RE to discard packets not intended for the particular RE. In other embodiments, the data packet is transmitted to the REs in the zone as part of a multi-cast, uni-cast, general broadcast, or the like. In block 432, the predicate is transmitted by the base station to the REs in the target zone. In various embodiments, the predicate is transmitted as part of the data packet, separate from the data packet on the same radio bearer as the data packet, in the same traffic channel as the data packet, on a control channel, on a traffic channel separate from the data packet, or the like. In some embodiments, the data packet and predicate are transmitted at the same time, and in other embodiments, the data packet and predicate are transmitted at different times.

In block 430 the REs receive the data packet, and in block 434 REs receive the predicate. In block 436, each RE evaluates the predicate to determine whether the particular RE meets the criteria set forth in the predicate. If the RE fails to pass evaluation of the predicate, where the RE fails to meet the conditions set forth in the particular RE, that RE discards the data packet in block 438. Otherwise, if the RE passes valuation of the predicate, with the RE meeting the conditions set forth in the predicate, the RE then decodes, where applicable, and processes the data packet in block 440. In some embodiments where the predicate is sent separately from the data packet, the data packet may be decoded separately from the predicate after the RE determines that the RE meets the conditions in the predicate. The RE may also, in some embodiments, then read, use, execute, or otherwise process data carried in the data packet. In some embodiments, the data packet may be transmitted only upon the RE's request after the RE determines that the RE meets the conditions in the predicate.

Figure 5:
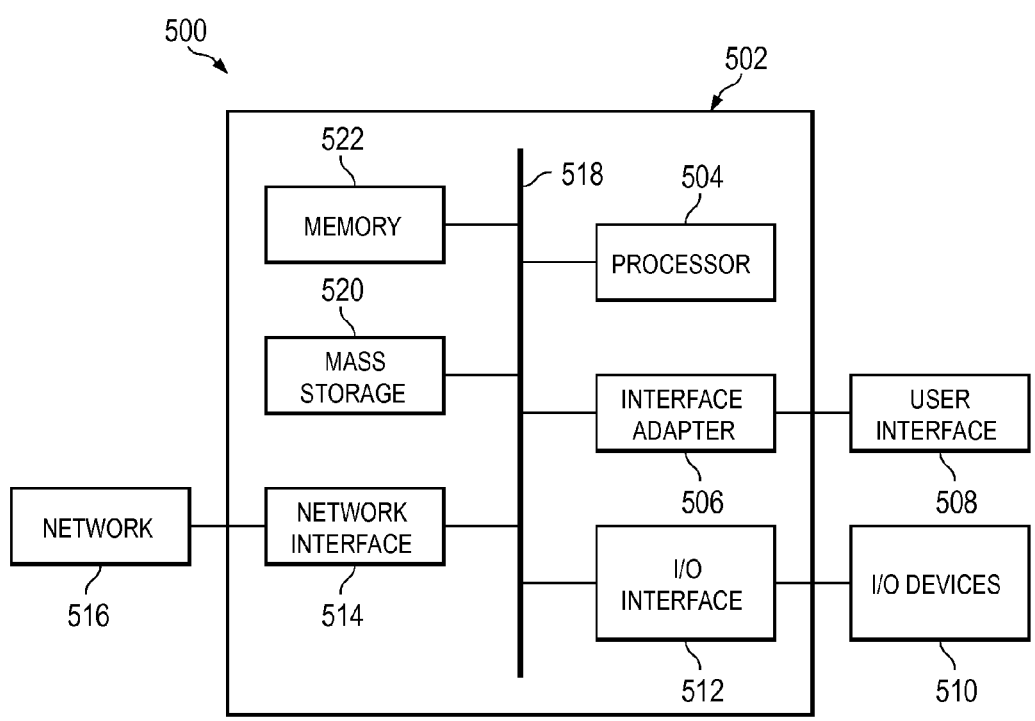
FIG. 5 is a system diagram illustrating a computing platform that may be used for implementing, for example, the devices and methods described herein, in accordance with an embodiment.

FIG. 5 is a system diagram illustrating a computing platform or hardware system 500 that may be used for implementing, for example, the devices and methods described herein, in accordance with an embodiment. Specific devices may utilize all of the components shown, or only a subset of the components, and levels of integration may vary from device to device. Furthermore, a device may contain multiple instances of a component, such as multiple processing units 502, processors 504, memories 522, transmitters, receivers, etc. The hardware system 500 may comprise a processing unit 502 equipped with one or more input/output devices 510, such as a speaker, microphone, touchscreen, keypad, mouse/keyboard/printer, user interface 508 such as a display, and the like. The processing unit 502 may include a central processing unit (CPU) such as a processor 504, memory 522, a mass storage device 520, an interface adapter 506, and an I/O interface 512 connected to a bus 518.

The bus 518 may be one or more of any type of several bus architectures including a memory bus or memory controller, a peripheral bus, video bus, or the like. The processor 504 may comprise any type of electronic data processor, and may be multiple processors. The memory 522 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 522 may include ROM for use at boot-up, and DRAM for program and data storage for use while executing programs.

The mass storage device 520 may comprise any type of non-transitory computer readable medium or storage device configured to store data, programs, and other information and to store instructions that for executing the methods a processes disclosed herein or make the data, programs, and other information accessible via the bus. In some embodiments, the mass storage device may have stored thereon instructions for causing the processor 504 to perform the method steps described above. The mass storage device 520 may comprise, for example, one or more of a solid state drive, hard disk drive, a magnetic disk drive, an optical disk drive, or the like.

The interface adapter 506 and the I/O interface 512 provide interfaces to couple external input and output devices to the processing unit 502. As illustrated, examples of input and output devices include the display or user interface 508 coupled to the interface adapter 506 and the input/output devices 510, such a mouse/keyboard/printer, coupled to the I/O interface 512. Other devices may be coupled to the processing unit 502, and additional or fewer interface cards may be utilized. For example, a serial interface such as Universal Serial Bus (USB) (not shown) may be used to provide an interface for a printer, or a digital interface may be provided to permit configuration of hardware systems 500 such as REs, base stations, network entities, or the like.

The processing unit 502 also includes one or more network interfaces 514, which may comprise networking adapters, wired links, such as an Ethernet cable or the like, and/or wireless links to access nodes, different networks or different network elements such as REs. The network interface 514 allows the processing unit 502 to communicate via the networks 516. For example, the network interface 514 may provide wireless communication via one or more transmitters/transmit antennas and one or more receivers/receive antennas, or by one or more antennas and a transceiver. Thus, the base station may have a network interface 514 that is a wireless transceiver and antenna for communicating with REs and additional network interfaces 514 for communicating with network devices such as the network element. Additionally, the REs may also be hardware systems 500 having wireless or wired network interfaces 514 for communicating, directly or indirectly, with the base station. In an embodiment, the processing unit 502 is coupled to a local-area network or a wide-area network for data processing and communications with remote devices, such as other processing units, the Internet, routers, other networking devices, remote storage facilities, or the like. In other embodiments, the processing system is a networking device, network element, server hosting an MTC application, cell finder, cell associate, traffic engineering component, RE, or the like and the network interface is a network card or optical interface that permits the processing unit 502 to communicate with the network.

As discussed above, the disclosed embodiments allow for location based addressing. With expected growth in the number of deployed MTC devices, the manner in which the network will assign addresses to MTC devices must be considered. If all MTC devices are to be provided with unique addresses, the resources dedicated to managing the addressing of devices will grow linearly with the growth of MTC devices. This may be either unwanted or infeasible for operators. To reduce the addressing burden, a method of location based addressing is provided. The coverage area of a mobile network can be considered to be divided into coverage areas of the access points in the mobile network. It will be understood that although the term coverage area may appear to be directed to a two-dimensional map, access points have three-dimensional coverage. The disclosed location based addressing method further subdivides the coverage area of an access point into sub-division elements or zones. These sub-division elements can be squares, or other shapes, that are tiled to cover an access point's coverage area, or they could be three dimensional shapes that are tiled to cover the three-dimensional coverage volume of an access point.

Each sub-division element is assigned a unique location based address. In one embodiment, each sub-division element in a coverage area is identically sized, and the geographic location of a corner (e.g. the northwest corner) of the element is used as the address of the element. The access point can assign a bearer to each sub-division element.

From the perspective of the M2M Application Server, MTC devices can associated with locations. These locations can be obtained from the MTC device, from the network, or the locations can be assigned during or before configuration of the device. The M2M application server can address a single device with a single location, or a plurality of devices by specifying a geographic area. Data destined for one or more MTC devices can be sent to a network gateway with the geographic location or area as an addressing parameter.

Figure 6:
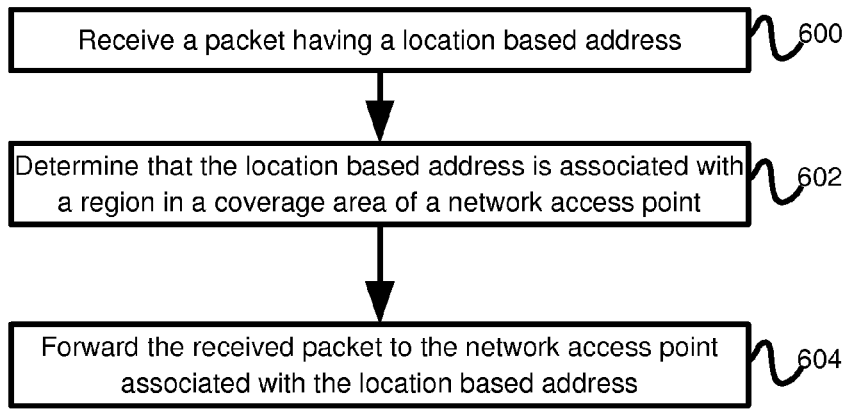
FIG. 6 is a flow diagram illustrating a method for handling a data packet at a network element according to some embodiments.

Upon receiving a data packet, a network gateway can carry out a method similar to that shown in FIG. 6. Those skilled in the art will appreciate that FIG. 6 illustrates one embodiment of a portion of the overall process flow shown in FIG. 4. The gateway receives the packet in step 600. The packet is typically received from an M2M application server and includes a location based address. As noted above, this address could be a specific geographic location, or a geographic range. In step 602, the provided location is used to determine which network access point (e.g. basestation 102) can be used to reach the intended device. When a specific location is provided, it may be possible that more than one access point is suitable, in which case the gateway can either delegate the actual AP select to another network node or it can select an AP using other network information. In other embodiments, when a geographic range is provided, it may be that the range requires more than one AP for suitable coverage. In this case, more than one AP can be determined as the appropriate AP in step 602. In step 604, the gateway can forward the received packet to the AP (or APs) that are identified in step 602.

Figure 7:
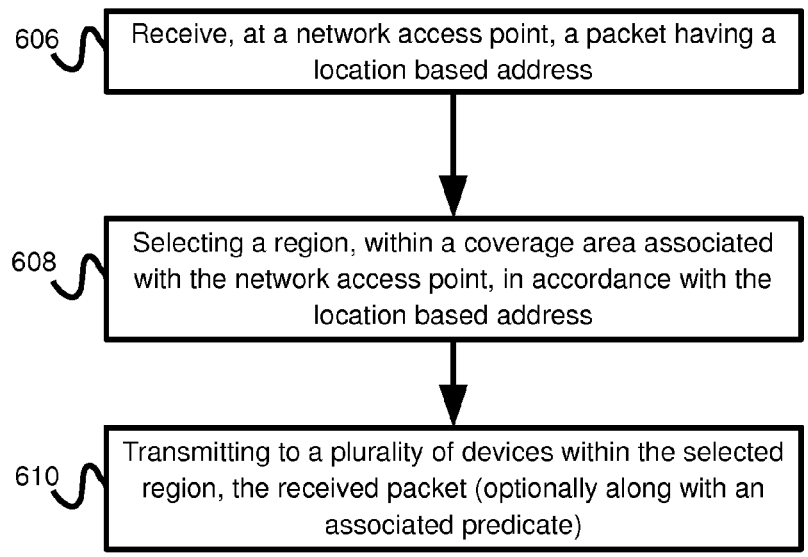
FIG. 7 is a flow diagram illustrating a method for handling a data packet at a access point according to some embodiments.

An AP that receives a forwarded packet from a gateway, can use the method illustrated in FIG. 7. In step 606, the network AP receives a packet with location based addressing information. In step 608, a region within the coverage area associated with the AP is selected. This region may be a strict subset of the AP coverage area, or it could include all of the AP coverage area. The region can be based on two or three dimensional subdivisions of the coverage area/volume. If the location based addressing information is a specific geographic location, the region will likely be a single subdivision (e.g. one zone 104). If the location based addressing information specifies a range, the region may be a collection of subdivisions (e.g. more than one zones 104). In step 640, the received packet is transmitted to all the devices in the selected region.

Figure 8:
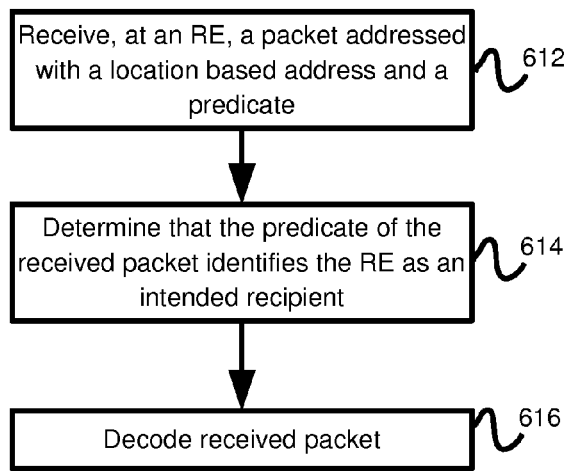
FIGS. 8 and 9 are a flow diagrams illustrating methods for handling a data packet at a remote equipment according to some embodiments.
Figure 9:
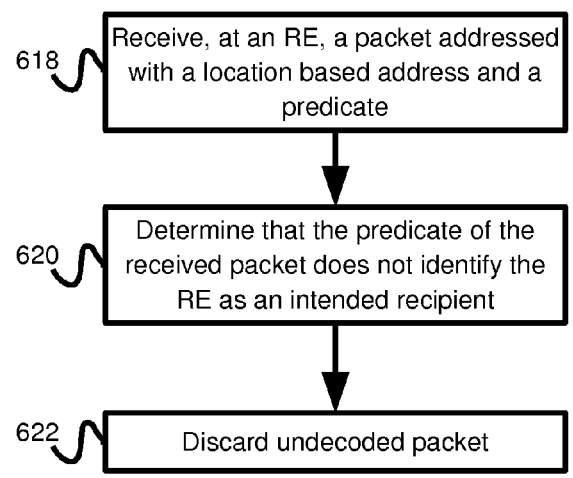

It should be noted that if the M2M AS wants to ensure that only a particular device (or subset of devices) is able to decode the data packet, it can use an optional feature, referred to as predicate based messaging. The data packet is sent to all REs in the region identified by the AP. In the payload of the packet, a predicate can be used to specify which devices, or classes of devices, the message is intended for. This may be done using application layer encoding, the particular nature of the implementation of which is not germane to the present discussion. The predicate may be associated with the packet at the M2M AS, at the gateway, or even at the AP. Thus the transmission of the packet to the AP in step 604, and the transmission of the packet from the AP to the plurality of devices in the selected zone in step 610, may be accompanied by the associated predicate (which may be embedded in the data packet).

Where a predicate is employed, methods shown in FIGS. 8 and 9 can be used by the MTC devices in the selected region. All devices in the selected region are able to receive a packet (with a predicate) that has been transmitted to a location based address as shown in step 612. In 614 the MTC device determines that it is an intended recipient of the data packet through examination or execution of the associated predicate. In step 616, the data packet is decoded by the MTD device. In the alternate, after receiving the packet in step 618, the MTC device determines that it is not the intended recipient based on a decoding of the predicate in step 620. In this case, the MTC device will discard the undecoded packet in step 622. It should be understood that in the description of FIG. 9, the term undecoded refers to an application layer consideration of the packet, and not a network level function.

An embodiment method for downlink machine type communications (MTC), includes receiving, at a base station, parameters including a geographic location related to a remote equipment (RE), receiving a predicate identifying the RE, determining a target zone in which the RE is located, determining a radio bearer associated with the target zone, and transmitting a data packet and the predicate by the base station on the radio bearer to a plurality of REs disposed in the target zone, the plurality of REs comprising at least the RE. In some embodiments, the parameters further include a service identifier (SID) of a machine type communication (MTC) application. In some embodiments, the predicate is transmitted on a control channel, and in some embodiments, the data packet is transmitted on a traffic channel. In some embodiments, the predicate identifies a group of REs.

An embodiment method for downlink machine-type communications (MTC), includes receiving, at a network element, a data packet having at least one first parameter comprising a at least one first geographic location, receiving a predicate associated with the data packet and determining a base station associated with the at least one first geographic location. Second parameters comprising at least one second geographic location related to the first geographic location and further comprising a base station identifier of the base station are generated, and the predicate and the data packet with the second parameters are transmitted to the base station. In some embodiments, the method further includes determining, according to traffic engineering information, a route to the base station across a network to which the network element is connected, where the predicate and the data packet are transmitted to the base station using the route. In some embodiments, the determining the base station associated with the at least one first geographic location includes retrieving, from a cell finder entity, cell association information describing the base station associated with the at least one first geographic location. In some embodiments, the predicate and the second parameters are each part of the data packet when the data packet is transmitted to the base station. In some embodiments, the determining the base station associated with the at least one first geographic location includes sending target zone information associated with the at least one second geographic location to the base station.

An embodiment network element includes a processor and a non-transitory computer readable storage medium connected to the processor. The non-transitory computer readable storage medium has stored thereon instructions that, when executed by the processor, cause the network element to obtain a data packet having at least one first parameter comprising a geographic location, wherein the data packet is received over a communications interface, obtain a predicate associated with the data packet and identify a network access point associated with the geographic location. The instructions further cause the network element to generate second parameters according to the geographic location and forward at least a portion of the data packet and the associated predicate to the identified network access point for transmission to a device associated with the geographic location. In some embodiments, the instructions further cause the network element to determine, according to traffic engineering information, a route to the network access point across a network to which the network element is connected. In some embodiments, the instructions causing the network element to identify the network access point associated with the geographic location include instructions that, when executed by the processor, cause the network element to retrieve, from a cell finder entity, cell association information describing the network access point associated with the geographic location. In some embodiments, the predicate and the second parameters are each part of the data packet when the data packet is transmitted to the network access point. In some embodiments, the instructions causing the network element to determine the network access point associated with the geographic location comprise instructions that, when executed by the processor, cause the network element to send target zone information associated with the geographic location to the network access point.

An embodiment network access point includes a transmitter, a processor connected to the transmitter, and a non-transitory computer readable storage medium connected to the processor. The non-transitory computer readable storage medium has stored thereon instructions that, when executed by the processor, cause the network access point to obtain parameters including a geographic location, and obtain data and a predicate identifying at least one remote equipment (RE), wherein the parameters, the data and the predicate are received in a data packet through the transmitter. The instructions further cause the network access point to determine a target zone in which the at least one RE is located, determine a radio bearer associated with the target zone, and transmit, on the radio bearer through the transmitter, the predicate and a data packet comprising the data to the at least one RE disposed in the target zone. In some embodiments, the parameters further include a service identifier (SID) of a machine type communication (MTC) application. In some embodiments, the instructions causing the network access point to transmit the predicate and the data packet further cause the network element to transmit the predicate on a control channel. In some embodiments, the instructions causing the network access point to transmit the predicate and the data packet further cause the network element to transmit the data packet on a traffic channel. In some embodiments, the predicate identifies a group of REs including the at least one RE.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for downlink machine type communications (MTC), comprising:
    receiving, at a base station associated with a set of zones, parameters including a geographic location related to a remote equipment (RE);
    receiving, at the base station associated with the set of zones, a predicate associated with the RE;
    determining a target zone from the set of zones, in which the RE is located based on the geographic location;
    determining a radio bearer from a set of radio bearers associated with the base station, the determined radio bearer associated with the target zone; and
    transmitting a data packet and the predicate by the base station to a plurality of REs disposed in the target zone, the plurality of REs comprising at least the RE, wherein the data packet is transmitted on the determined radio bearer.

2. The method of claim 1, wherein the parameters further include a service identifier (SID) of a machine type communication (MTC) application.

3. The method of claim 1, wherein the predicate is transmitted on a control channel on a second radio bearer different from the determined radio bearer.

4. The method of claim 3, wherein the data packet is transmitted on a traffic channel.

5. The method of claim 1, wherein the predicate identifies a group of REs including the RE.

6. The method of claim 1, wherein the predicate comprises two or more conditions, and the predicate is used by the RE to determine whether the RE is an intended recipient of the data packet such that:
    when it is determined that the RE meets the two or more conditions, the RE processes the data packet; and
    when it is determined that the RE does not meet the two or more conditions, the RE discards the data packet.

7. The method of claim 1, wherein each zone of the set of zones is associated with a different radio bearer of the set of radio bearers.

8. The method of claim 1, the transmitting comprising:
    transmitting the data packet and the predicate by the base station on the radio bearer to the plurality of REs disposed in the target zone.

9. A network access point, comprising:
    a transmitter;
    a processor connected to the transmitter; and
    a non-transitory computer readable storage medium connected to the processor and having stored thereon instructions that, when executed by the processor, cause the network access point to:
        obtain parameters including a geographic location;
        obtain data and a predicate associated with a remote equipment (RE);
        determine a target zone from a set of zones associated with the network access point in which the RE is located based on the geographic location;
        determine a radio bearer from a set of radio hearers associated with the network access point, the determined radio bearer associated with the target zone; and
        transmit the predicate and a data packet comprising the data to a plurality of REs disposed in the target zone, the plurality of REs comprising at least the RE, wherein the data packet is transmitted on the determined radio hearer through the transmitter.

10. The network access point of claim 9, wherein the parameters further include a service identifier (SID) of a machine type communication (MTC) application.

11. The network access point of claim 9, wherein the instructions causing the network access point to transmit the predicate and the data packet comprise instructions that, when executed by the processor, cause the network access point to transmit the predicate on a control channel on a second radio bearer different from the determined radio bearer.

12. The network access point of claim 11, wherein the instructions causing the processor to transmit the predicate and the data packet further comprise instructions that, when executed by the processor, cause the processor to transmit the data packet on a traffic channel.

13. The network access point of claim 9, wherein the predicate identifies a group of REs including the RE.

14. The network access point of claim 9, wherein the parameters, the data and the predicate are received in a data packet.

15. A non-transitory computer-readable medium storing computer readable instructions that when executed cause one or more processors of a processing system to execute a method comprising:
   receiving parameters including a geographic location related to a remote equipment (RE);
   receiving a predicate associated with the RE;
   determining a target zone from a set of zones associated with a base station in which the RE is located based on the geographic location;
   determining a radio bearer from a set of radio bearers associated with the base the determined radio bearer associated with the target zone; and
   transmitting a data packet and the predicate to a plurality of REs disposed in the target zone, the plurality of REs comprising at least the RE, wherein the data packet is transmitted on the determined radio bearer.

16. The non-transitory computer-readable medium of claim 15, wherein the parameters further include a service identifier (SID) of a machine type communication (MTC) application.

17. The non-transitory computer-readable medium of claim 15, wherein the predicate is transmitted on a control channel on a second radio bearer different from the determined radio bearer.

18. The non-transitory computer-readable medium of claim 15, wherein the predicate associated with the RE identifies a group of REs in the target zone with at least one of a same type of device, a same service class, a same area, and a same RE group ID, wherein the group of REs comprises the RE.

19. The non-transitory computer-readable medium of claim 15, wherein the predicate is transmitted in the data packet.

20. An apparatus for supporting wireless communications, the apparatus comprising:
   at least one processor; and
   a non-transitory computer readable storage medium storing programming for execution by the at least one processor, the programming including instructions to:
      obtain parameters including a geographic location;
      obtain data and a predicate associated with a remote equipment (RE);
      determine a target zone from a set of zones associated with a base station in which the RE is located based on the geographic location;
      send the predicate, information about the target zone, and a data packet comprising the data to the base station, the data packet prompting the base station to:
         determine a radio bearer from a set of radio bearers associated with the base station, the determined radio bearer associated with the target zone; and
         transmit the predicate and the data packet to at least one RE disposed in the target zone, the at least one RE comprising the RE, wherein the data packet is transmitted on the determined radio bearer.

21. The apparatus of claim 20, wherein the parameters further include a service identifier (SID) of a machine type communication (MTC) application.

22. The apparatus of claim 20, wherein the programming further includes instructions to transmit the predicate on a control channel on a second radio bearer different from the determined radio bearer.

23. The apparatus of claim 20, wherein the predicate associated with the RE identifies a group of REs in the target zone with at least one of a same type of device, a same service class, a same area, and a same RE group ID, the group of REs including the RE.

24. The apparatus of claim 20, wherein the predicate is transmitted in the data packet.

25. The apparatus of claim 20, wherein the parameters, the data and the predicate are received in a data packet.

* * * * *

UNITED STATES PATENT AND TRADEMARK OFFICE
CERTIFICATE OF CORRECTION

PATENT NO. : 10,085,132 B2
APPLICATION NO. : 14/949231
DATED : September 25, 2018
INVENTOR(S) : Xu Li Page 1 of 1

It is certified that error appears in the above-identified patent and that said Letters Patent is hereby corrected as shown below:

In the Claims

In Column 18, Line 47, Claim 9, delete "hearers" and insert --bearers--.

In Column 18, Line 55, Claim 9, delete "hearer" and insert --bearer--.

In Column 19, Line 20, Claim 15, delete "with the base the determined radio bearer" and insert --with the base station, the determined radio bearer--.

Signed and Sealed this
Twelfth Day of March, 2019

Andrei Iancu
*Director of the United States Patent and Trademark Office*